United States Patent
Kobayashi

(10) Patent No.: US 6,898,500 B2
(45) Date of Patent: May 24, 2005

(54) VEHICLE INTEGRATED CONTROL SYSTEM

(75) Inventor: Masayuki Kobayashi, Anjo (JP)

(73) Assignee: Denso Corporation, Kariya (JP)

(*) Notice: Subject to any disclaimer, the term of this patent is extended or adjusted under 35 U.S.C. 154(b) by 75 days.

(21) Appl. No.: 10/655,033

(22) Filed: Sep. 5, 2003

(65) Prior Publication Data

US 2004/0064220 A1 Apr. 1, 2004

(30) Foreign Application Priority Data

Sep. 30, 2002 (JP) .................................... 2002-285547

(51) Int. Cl.[7] ........................ B60K 41/00; B60R 16/02; G05B 15/02
(52) U.S. Cl. ........................... 701/48; 701/45; 701/36
(58) Field of Search .......................... 701/48, 45, 36, 701/107, 114

(56) References Cited

U.S. PATENT DOCUMENTS

| | | | | |
|---|---|---|---|---|
| 4,532,594 A | * | 7/1985 | Hosaka et al. | 701/114 |
| 6,263,262 B1 | * | 7/2001 | Bitzer et al. | 701/1 |
| 6,292,741 B1 | | 9/2001 | Bitzer et al. | |
| 6,301,528 B1 | * | 10/2001 | Bertram et al. | 701/1 |
| 6,339,739 B1 | * | 1/2002 | Folke et al. | 701/70 |
| 6,434,459 B2 | * | 8/2002 | Wong et al. | 701/36 |
| 6,463,373 B2 | * | 10/2002 | Suganuma et al. | 701/48 |
| 6,553,297 B2 | * | 4/2003 | Tashiro et al. | 701/48 |
| 6,622,074 B1 | * | 9/2003 | Coelingh et al. | 701/48 |
| 6,810,314 B2 | * | 10/2004 | Tashiro et al. | 701/48 |
| 6,816,764 B2 | * | 11/2004 | Coelingh et al. | 701/37 |

FOREIGN PATENT DOCUMENTS

| | | |
|---|---|---|
| JP | 7-46665 | 2/1995 |
| JP | 10-20970 | 1/1998 |

OTHER PUBLICATIONS

US Patent Application Publication No. 2001/0056318, Published Dec. 27, 2001; Tashiro et al; "Integrated Vehicle Control System Having Manager ECU"; See p. 2.

* cited by examiner

Primary Examiner—Michael J. Zanelli
(74) Attorney, Agent, or Firm—Nixon & Vanderhye P.C.

(57) ABSTRACT

A vehicle integrated control system includes an intra-vehicle communication network, a plurality of ECUs coupled to the intra-vehicle communication network having programs for controlling at least an operation of a plurality of functional elements of the vehicle and a vehicle coordinator for transmitting operation commands to more than one of these control programs through the intra-vehicle communication network or a inter-process communication. These control programs control the operation of the corresponding functional element on the basis of the received operation commands. The vehicle coordinator is included in an ABS ECU having a brake control program capable of effecting an emergency stop of the vehicle out of a plurality of control programs of a target transmitting operation commands.

7 Claims, 8 Drawing Sheets

VEHICLE INTEGRATED CONTROL SYSTEM

CROSS REFERENCE TO RELATED APPLICATION

This application is based on and incorporates herein by reference Japanese Patent Application No. 2002-285547 filed on Sep. 30, 2002.

FIELD OF THE INVENTION

This invention relates to a vehicle integrated control system for integrally controlling a plurality of functional elements of a vehicle with an intra-vehicle communication network, which is capable of avoiding an emergent danger even though the intra-vehicle communication network fails to operate properly.

BACKGROUND OF THE INVENTION

Conventionally, a system for integrally controlling the whole of a plurality of functional elements forming functions of a vehicle is proposed. This integrated control system in which the functional elements of a vehicle are divided in accordance with the functions is provided with a manager for management among the respective divided functions, as disclosed in U.S. Pat. No. 6,292,741 B1 (JP-A-2000-71819).

The manager is realized, for example, as a special ECU manager (electronic control unit) for managing control in an engine ECU and AT ECU as control functions of the engine and AT (automatic transmission), which are functional elements, to manage a vehicle axle torque of the whole of the vehicle as disclosed in US 2001/0056318 A1 (JP-A-2002-81345).

In this example, the engine ECU and the AT ECU transmit characteristic information of the engine and the AT to the manager ECU. The manager ECU transmits commands necessary for making the vehicle axle torque equal to a target value on the basis of the received characteristic information to the engine ECU and the AT ECU. The engine ECU and the AT ECU control the engine and the AT on the basis of the commands so that the vehicle axle torque attains the target value.

Thus, the manager exists at an upper level of the control functions for the vehicle and is realized as control logic for managing these control functions, for example, software. Thus, to realize the manager itself, hardware such as inherent special sensors and actuators is not necessary. Accordingly, it is not always necessary that the manager is realized as the manager ECU specialized in its function. It is also realizable, for example, as software in the engine ECU.

It is also possible to realize the manager as software in not only the above engine ECU but also in any ECU included in the ECUs within the network for communication among respective ECUs to integrally control the vehicle.

However, in this case, if a communication failure such as disconnection occurs in the communication network, the communication between the manager and respective ECUs as control elements may stop.

A vehicle integrated control system in which a manager (coordinator) is installed in the engine ECU is proposed as shown in FIG. 12. An engine ECU 50 and an ABS (anti-lock brake system) ECU 60 in the vehicle integrated control system. The ABS ECU 60 is a control function of the ABS as a functional element of the vehicle. The engine ECU 50 and the ABS ECU 60 can communicate with each other through a network with a serial communication line 49 by TTP (time triggered protocol). The serial communication line 49 is a duplex one.

The engine ECU 50 has a driver/receiver IC 51, a protocol IC 52, and a microcomputer 53. The ABS ECU 60 has a driver-receiver IC 61, a protocol IC 62, and a microcomputer 63.

The driver/receiver IC 51 or 61 converts the electric signal received from the serial communication line 49 into digital data that can be dealt with by the protocol ICs 51 and 62 and supplies it to the protocol IC 52 or 62. Moreover, the driver/receiver IC 51 or 61 converts the digital data inputted from the protocol IC 52 or 62 into an electric signal and supplies it to the serial communication line 49.

The protocol IC 52 or 62 processes data inputted from the driver/receiver IC 51 or 61 in accordance with the frame format of the used communication protocol to convert it into data having a format independent of the communication protocol and then supplies it to the microcomputer 53 or 63. Moreover, the protocol IC 52 or 62 effects a process of the frame format such as addition of ID or CRC to the data inputted from the microcomputer 53 or 63 in such a way that the data conforms to the used communication protocol and then supplies it to the driver/receiver IC 51 or 61.

The microcomputer 53 or 63 includes a CPU, a RAM, and a flash memory (not shown). The CPU performs various processes by reading the program (software) stored in the flash memory and executing the program. Moreover, the microcomputer 53 or 63 carries out writing/reading data into/from the RAM in response to the necessity of this processing. In addition, the microcomputer 53 or 63 inputs data from the protocol IC and outputs data for transmission if communication with other ECU is necessary.

In the flash memories in the microcomputers 53 and 63, various programs are stored. More specifically, in the flash memory of the microcomputer 53, a vehicle coordinator 54 and an engine controller 55 are stored as a manager. In the flash memory of the microcomputer 63, an ABS controller 64 is stored. Execution of these programs is started together with the startup of the engine ECU 50 and ABS ECU 60. Moreover, the vehicle coordinator 54 and the engine controller 55 are executed by the same CPU at the same time as different processes.

In this specification, for convenience, the processes by execution of program by the CPU of the microcomputer are described as the process executed by the program itself. For example, "process executed after reading out the engine controller 55 by the CPU of the microcomputer 53" is described as "process executed by engine controller 55".

The ABS controller 64 executes a process for managing a braking force so as to avoid locked conditions of wheels on the basis of the wheel speed information inputted into the microcomputer 63 from wheel speed sensors (not shown). Moreover, here, the ABS controller 64 receives a command of a braking force from the vehicle coordinator 54 through the serial communication line 49 and executes the process for regulating the braking force on the basis of the command.

The vehicle coordinator 54 performs regulation between the control functions of the engine controller 55 and the ABS controller 64 or the like and commands them.

The engine controller 55 carries out processes such as fuel injection, ignition, and an intake air flow in the engine as to regulation, detection, or the like on the basis of the command from the vehicle coordinator 54.

Moreover, communication among nodes of the vehicle coordinator 54, the ABS controller 64, and other control functions not shown is carried out through the serial communication line 49. The intra-node communication between the vehicle coordinator 54 and the engine controller 55 is performed by inter-process communication.

For example, in such a system, consider that the vehicle coordinator 54 transmits a command of braking operation to the ABS controller 64 to make an emergency stop of traveling of the vehicle. As the cause of the case of emergency stop of traveling of the vehicle, the engine controller 55 may detect an abnormality in an intake air flow to engine and transmits the abnormality to the vehicle coordinator 54 which transmits, on the basis of the reception, the vehicle stop command to the ABS controller 64.

In such a case, if the serial communication line 49 is in the normal condition, the ABS controller 64 can receive this command and operate the ABS on the basis of this command. That is the vehicle can be stopped on emergency.

However, if a failure such as a partial disconnection of the serial communication line 49 in the network occurs, a failure in a device for communication function in the ECU such as the driver/receiver IC 51, the protocol IC 52, the driver/receiver IC 61, and the protocol IC 62, the command of the vehicle coordinator 54 may not reach the ABS controller 64. Namely, there may be the case that the ABS controller 64 cannot effect the barking operation on the basis of the command of the vehicle coordinator 54.

In that case, the vehicle coordinator 54 can stop the fuel injection and ignition of the engine by transmitting commands for stopping the engine to the engine controller 55. However, such an operation effects only gradual deceleration by the engine brake. Thus, the engine does not have the function for making an emergency stop of the traveling vehicle.

The emergency stop function of the traveling vehicle relates to avoiding danger on emergence of the vehicle. As other functions relating to avoiding danger on emergence of the vehicle, there is control for power supply to prevent overcurrent or the like by the alternator for example.

SUMMARY OF THE INVENTION

The object of the present invention is to avoid a danger on emergency through the intra-vehicle communication network having a failure, in a system where integrated control of vehicle functions is made through intra-vehicle communication network by the manager.

In order to achieve the above object, a vehicle integrated control system is constructed with a plurality of nodes, each coupled to an intra-vehicle communication network including control means for controlling at least one of operations of a plurality of functional elements of a vehicle, and a manager for supplying operation commands to more than one of the control means, the control means controlling the operation of the functional element thereof on the basis of inputted the operation command. The manager is included in at least one of nodes having the control means for controlling the functional element capable of avoiding a danger of the vehicle on emergency out of a plurality of the control means of a target supplied with the operation commands.

The manager supplies the operation commands through the intra-vehicle communication network to, out of a plurality of the control means of the target supplied with the operation commands, the control means in the nodes other than the node including the same and supplies the operation command through the intra-node communication to, out of a plurality of the control means of the target supplied with the operation commands, the control means included by the node including the same for controlling the functional element capable of avoiding a danger of the vehicle on emergency.

In the system in which the manager performs the integrated control of functions of the vehicle through the intra-vehicle communication network, even though the intra-vehicle communication network is inoperative, the manager can supply a command to the control means for controlling the functional element capable of avoiding a danger of a vehicle on emergency by the intra-node communication, so that the danger on emergency can be avoided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
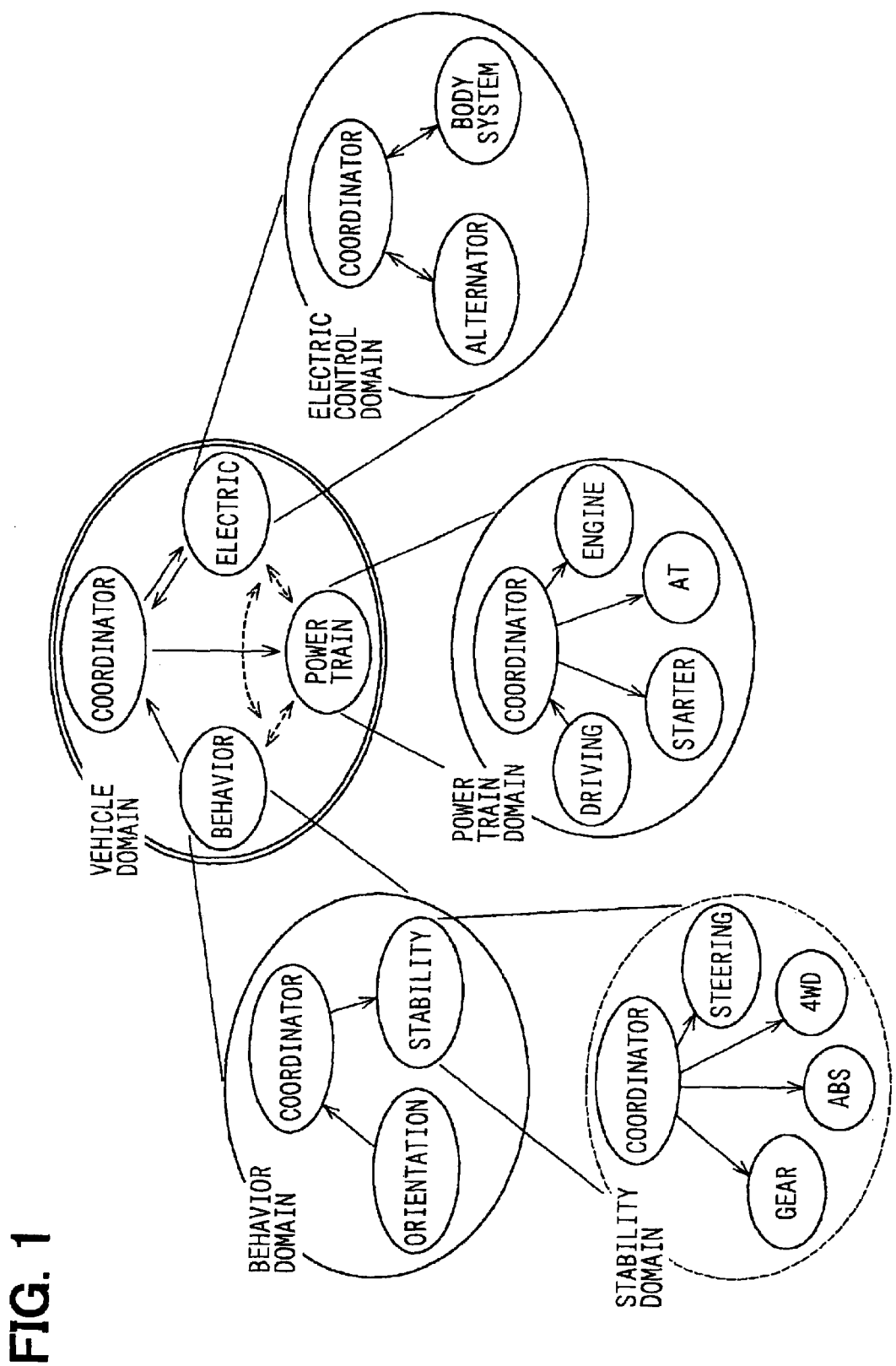
FIG. 1 is a schematic diagram of a vehicle integrated control system according to the first embodiment of the present invention.

In FIG. 1, the structure for controlling the functional elements of a vehicle such as an engine, a transmission, a clutch, a starter, an alternator, an ABS, an operation device, and a 4WD (four-wheel drive) of the vehicle is taken apart and hierarchized in accordance with the function.

The functions of the vehicle are largely divided into three, namely, vehicle behavior (motion), power train, and electric control. A vehicle coordinator makes regulation among these three functions (level 0: vehicle domain). That is, the vehicle coordinator obtains information about respective functions of the vehicle behavior, the power train, and the electric control, decides a control course of the whole of the vehicle on the basis of the obtained information, and supplies commands of various operations to the vehicle behavior function, the power train function, and the electric control function on the basis of this control course. As the control course, there is a target axle torque for example.

The above functions are further divided into lower layer functions, respectively.

The electric control is divided into two functions, namely, alternator control and body system control. The electric control coordinator makes regulation between these two functions (layer 1: electric control domain). That is, the electric control coordinator receives information of the amount of supplied current from the alternator control, information of operation of various types of body system devices from the body system control, and a command such as upper current limit value from the vehicle coordinator and transmits commands of operations to the alternator control and the body system control on the basis of the received information and command. Here, the body system control is a generic name for controls such as a power window, a wiper, an air-conditioner, and a door lock.

The power train is divided into four functions, namely, engine control, AT control, starter control, and driving force detection. The power train coordinator makes regulation among four functions (layer 1: power train coordinator). That is, the power train coordinator receives information of the axle torque from driving force detection and a command such as a target axle torque from the vehicle coordinator. On the basis of the information and reception, it supplies commands of injection, ignition, gear-shifting, and starter on/off to the engine control, the AT control, and the starter control, respectively.

The vehicle behavior is divided into two functions, namely, orientation detection and vehicle stability. The vehicle behavior coordinator makes regulation between these functions (layer 1: vehicle behavior domain). That is, the vehicle behavior coordinator receives information such as a vehicle velocity, a yaw rate, a forward acceleration, a lateral acceleration by the orientation detection and a command from the vehicle coordinator. On the basis of these, it supplies a command of a target tire force (the force to tires) to the function of the vehicle stability.

Moreover, the coordinators at the layer 1 including the vehicle behavior coordinator, the power train coordinator, and the electric control coordinator, supply information within respect domains to the vehicle coordinator that is the upper layer coordinator.

The function of vehicle stability at the vehicle behavior domain is further divided into lower layer functions. That is, the vehicle stability is divided into four, namely, steering control, 4WD control, ABS control, and differential gear control. The vehicle stability coordinator makes regulation among these four functions (layer 2: vehicle stability domain). That is, the vehicle stability coordinator inputs a command from the vehicle behavior coordinator and supplies commands to respective four functions on the basis of this command. Here, this hierarchizing according to the functional division is one of classifying methods, and thus, it is not always necessary to divide the vehicle functions as described above in the actual manufacturing step. For example, the body system control may not be under the electric control coordinator but may be under a body system coordinator that is independently provided.

Figure 2:
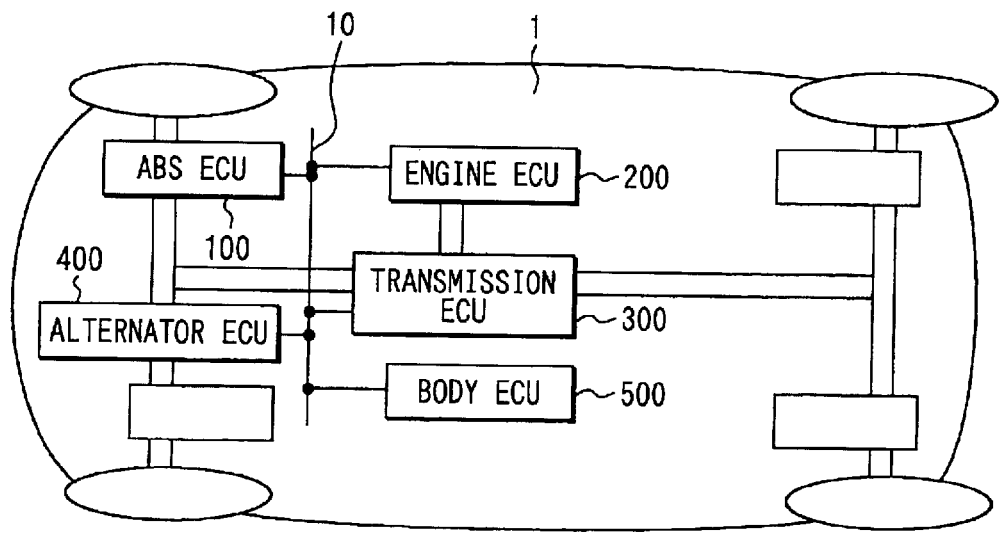
FIG. 2 is a structural diagram of a communication network within a vehicle in the first embodiment.

FIG. 2 illustrates a vehicle 1 having a communication network. This network includes a serial communication line 10 and further includes an ABS ECU 100, an engine ECU 200, a transmission ECU 300, an alternator ECU 400, and a body ECU 500 that are devices for realizing the structure of control illustrated in FIG. 1. These ECUs can transmit and receive communication data through the serial communication line 10. Each of these ECUs is connected to the communication network as one node.

Within this communication network, other ECUs (not shown) such as a steering ECU and a 4WD ECU are connected to the communication network as one node, respectively.

Figure 3:
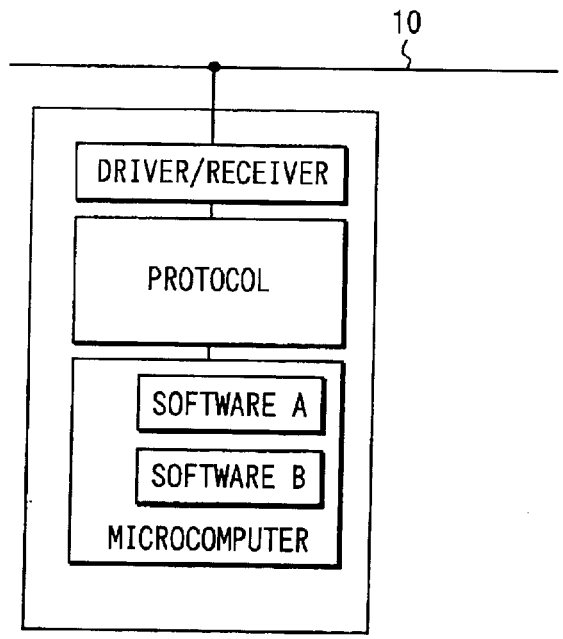
FIG. 3 is a basic structural diagram of an ECU in the first embodiment.

The basic structures of these ECUs are common and shown in FIG. 3. The ECU includes a driver/receiver IC, a protocol IC and a microcomputer.

The driver/receiver IC converts the electronic signal received from the serial communication line 10 into digital data that can be dealt within the ECU and supplies it to the protocol IC. Moreover, the driver/receiver IC converts the digital data inputted from the protocol IC into an electronic signal and supplies it to the serial communication line 10.

The protocol IC processes the data inputted from the drive/receiver IC in accordance with the frame format of the used communication protocol and converts it into data having a format independent of communication protocols and then supplies it to the microcomputer. Moreover, the protocol IC processes the data inputted from the microcomputer to have a frame format by adding ID, CRC, or the like so that the data conforms to the used communication protocol and then supplies it to the protocol IC. Here, as a communication protocol, for example, CAN (Controller Area Network) is used.

The microcomputer has a CPU, a RAM, and a flash memory (not shown). The CPU executes various types of processes by reading out the program stored in the flash memory and executing it. Moreover, the microcomputer performs writing/reading to the RAM as this process requires and outputs data for inputting in and transmitting from the protocol IC as necessity of communication with other ECUs.

The flash memory of the microcomputer stores programs. Execution of these programs is started with the startup of the ECU. The CPU can execute a plurality of pieces of software in the flash memory substantially at the same time as different processes, respectively. Moreover, these programs can transmit and receive information and control by inter-process communication. This inter-process communication is one of types of intra-node communication. Here, the intra-node communication is a concept further including serial communication within a node, inter-task communication within a microcomputer, and communication between two microcomputers.

Moreover, it is very easy to divide one program into a plurality of parts or to combine a plurality of programs into one. Therefore, if it is assumed that there are a plurality of programs, it is possible to consider a given part of them as one program. In that case, the transmission and reception of information among a plurality of combined programs can be regard as an intra-program communication.

The structure as described above is common to respective ECUs. In addition to the common structure, each of ECUs stores the program according to its function in the flash memory and has functional elements such as sensors and actuators for realizing its control function.

Figure 4:
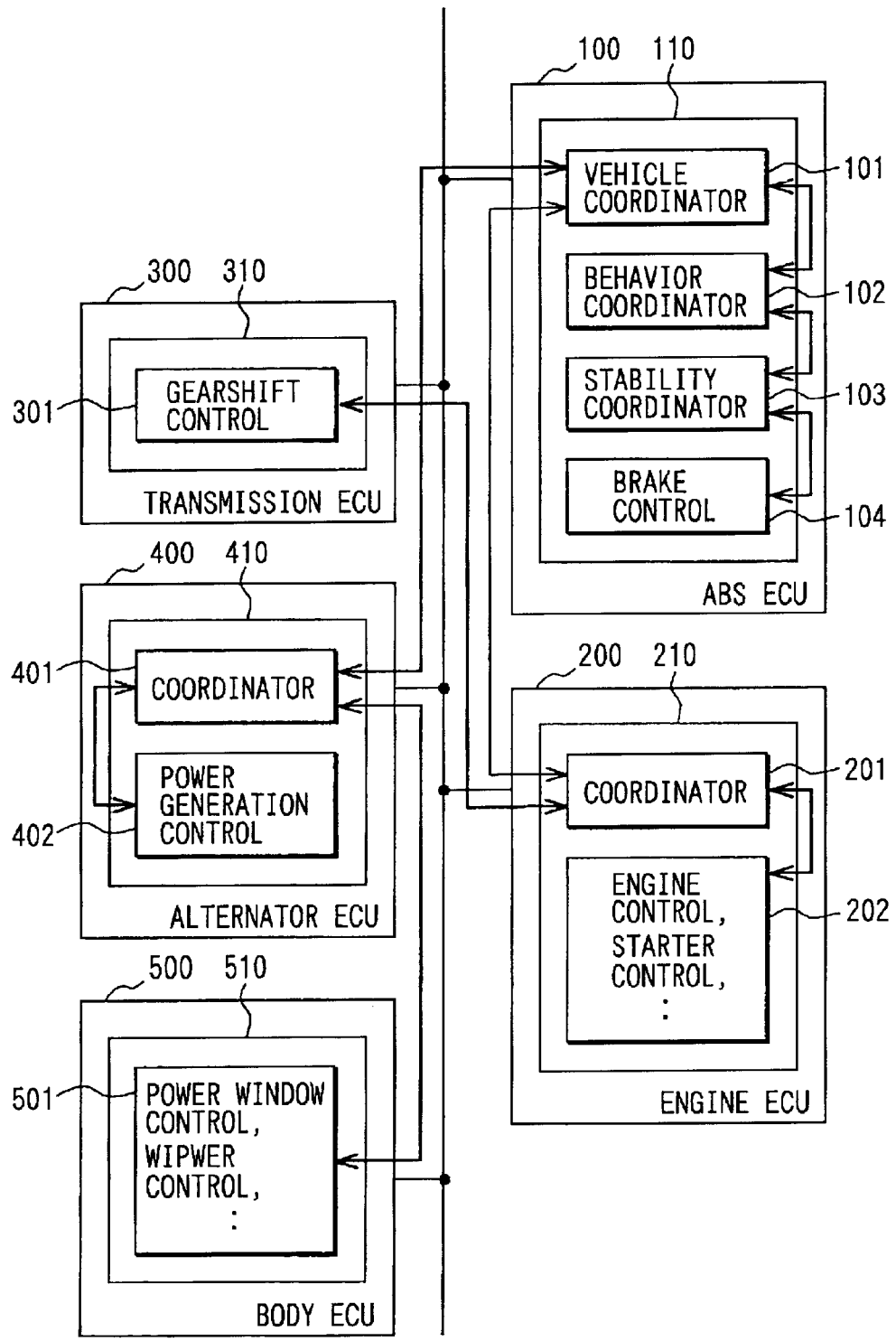
FIG. 4 is a structural diagram of each ECU in the first embodiment.

FIG. 4 illustrates structures of the ABS ECU 100, the engine ECU 200, the transmission ECU 300, the alternator ECU 400, and the body ECU 500. Here, these ECUs have the common structure. However, in FIG. 4, for convenience, only the types of programs in respective microcomputers 110, 210, 310, 410, and 510 are illustrated in detail.

The microcomputer 310 has a gearshift control program 310 in the flash memory. The gearshift control program 301 detects information such as shift range (P, R, N, D or L) of the AT (not shown) from inputs from respective sensors (not shown) and receives commands from the power train coordinator 201. The gearshift control program 301 controls the gearshift on the basis of the input of these pieces of information by supplying control signals to respective actuators connected to a microcomputer 310. Moreover, the gearshift control program 301 transmits information of the shift range, the vehicle velocity, and the gearshift position to the power train coordinator 201.

The microcomputer 510 has a control program 501 for power windows or the like in the flash memory. The program 501 for power windows or the like receives a command from the electric control coordinator 401 and supplies control signals to respective actuators connected to the microcomputer 510 on the basis of the received command to control operations of the power windows, the wiper, and the door lock, or the like.

The microcomputer 210 has the power train coordinator 201 and the engine control program 210 in the flash memory.

The engine control program 201 detects information such as a throttle opening degree, a water temperature, and an intake air flow, a cylinder positions, and ignition of the engine from inputs from respective sensors and controls the fuel injection, the ignition, and the intake air flow, of the engine and operation of turning on/off of the starter or the like on the basis of the command from the power train coordinator 210 by supplying control signals to respective actuators connected to the microcomputer 210. Moreover, the engine control program 201 supplies information obtained from the above sensors and information of the control condition provided by the respective actuators to the power train coordinator 201.

The power train coordinator 201 receives a command regarding the driving force such as the target axle torque from the vehicle coordinator 101, determines a target engine torque and a target gearshift position according to the predetermined rule on the basis of the command. It further determines, on basis of this command, control parameters such as the amount of fuel injection, ignition timings, an intake air flow, of the engine and the gearshift position, and transmits the command in accordance with this parameter to the engine control program 202 and the gearshift control program 301. Moreover, the power train coordinator 201 transmits the information received from the engine control program 202 or the like to the vehicle coordinator 101.

The microcomputer 410 has the electric control coordinator 401 and a power generation control program 402 in the flash memory to perform inputting and outputting control and information to and from the alternator.

The power generation control program 402 inputs the command from the electric control coordinator 401, and controls the output current of the alternator on the basis of this command.

The electric control coordinator 401 receives commands such as an upper limit value of power supplying and operation/stop of a specific functional element from the vehicle coordinator 101. Further, according to this, the electric control coordinator 401 supplies commands of operation, stop or the like to the control program 501 for the power window, etc. or a control function of electric functional element (not shown) and supplies a command of output current control for the alternator to the power generation control program 402. Moreover, the electric control coordinator 401 inputs information of operation condition or the like from the control program 501 for the power window or the like and transmits the information to the vehicle coordinator 101.

The microcomputer 110 has the vehicle coordinator 101, the vehicle behavior coordinator 102, the vehicle stability coordinator 103, and the brake control program 104.

The brake control program 104 detects wheel speed information from input from wheel sensors (not shown) and executes a process for regulating a braking force with avoiding a lock condition of wheels on the basis of the information. Moreover, the brake control program 104 inputs a command regarding the braking force from the vehicle stability coordinator 103 and controls the brake by supplying a control signal to actuators on the basis of the command. As the brake control, the hydraulic pressure in wheel cylinders of wheels is controlled by supplying control signals to hydraulic pressure units as actuators for example. Moreover, the vehicle stability coordinator 103 supplies information such as condition or the like of the brake control to the vehicle stability coordinator 103.

The vehicle stability coordinator 103 inputs commands such as a target tire force for maintaining the stability of the vehicle from the vehicle behavior coordinator 102 and inputs the above information from the brake control program 104. Moreover, the vehicle stability coordinator 103 determines control parameters such as the steering angle, driving forces of respective wheels, the braking torques, and the differential ratio on the basis of the inputted information to realize the commanded tire force and supplies a command of the target brake torques to the brake control program 104 on the basis of these parameters. Further the vehicle stability coordinator 103 supplies commands of target values of the determined wheel angle, differential ratio, steering angle, or the like to the control functions such as 4WD, the differential gear box, and the steering (not shown). Moreover, the vehicle stability coordinator 103 supplies the information inputted from the brake control program 104 or the like to the vehicle behavior coordinator 102.

The vehicle behavior coordinator 102 supplies to the vehicle coordinator 101 a signal for requesting the wheel axle torques necessary for optimizing the behavior to stabilize the vehicle. Moreover, the vehicle behavior coordinator 102 receives positional information such as the yaw rate, and acceleration from an ECU (not shown) for detecting the position of the vehicle and supplies, on the basis of it, the target tire force to the vehicle stability coordinator 103.

The vehicle coordinator 101 transmits and receives information to and from the vehicle behavior coordinator 102, the power train coordinator 201, and the electric control coordinator 401. That is, the vehicle coordinator 101 receives information of wheel axle torques necessary for optimizing the behavior of the vehicle from the vehicle behavior coordinator 102, information or the like regarding the engine control program 202 from the power train coordinator 201, and information regarding the power generation control program 402 and the control program 501 and the like from the electric control coordinator 401. The vehicle coordinator 101 transmits a command of the target axle torque to the power train coordinator 201 on the basis of the received information and supplies a command such as limiting the amount of power generation to the electric control coordinator 401.

Figure 5:
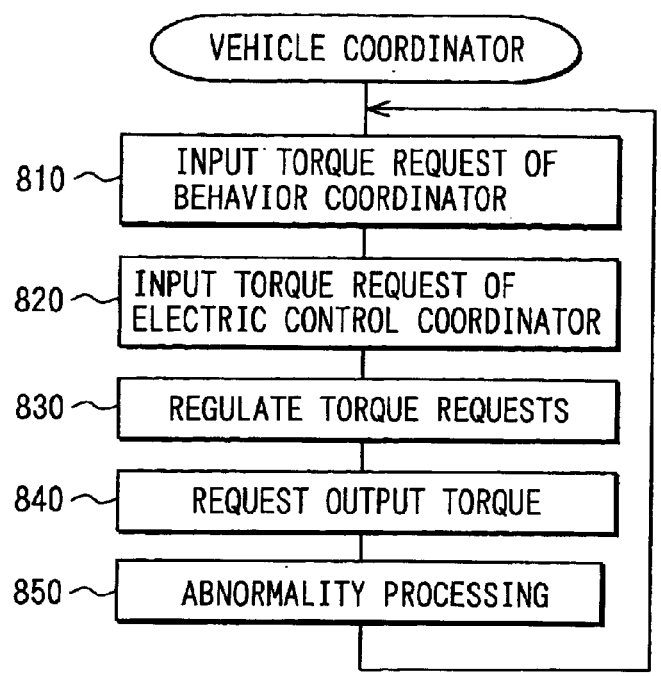
FIG. 5 is a flow chart of a process executed by a vehicle coordinator in the first embodiment.

FIG. 5 illustrates a flow chart generally illustrating the process of the vehicle coordinator 101 for transmitting the command of the wheel axle torque.

The vehicle coordinator 101 inputs a request of wheel axle torque from the vehicle behavior coordinator 102 at step 810. At step 820, the vehicle coordinator 101 receives information transmission from the electric control coordinator 401. At this instance, if three is also a wheel axle torque request from the electric control coordinator 401, the vehicle coordinator receives it also.

At step 830, on the basis of the request from the vehicle behavior coordinator 102 and information and a request from the electric control coordinator 401, the target axle torque of instruction for the power train coordinator 201 is calculated. The method of calculation is previously set in the vehicle coordinator 101.

At step 840, the instruction of the calculated target axle torque is transmitted to the power train coordinator 201. At step 850, an abnormality processing routine described later is executed. When this abnormality processing routine finishes, processing returns to step 810.

Figure 6:
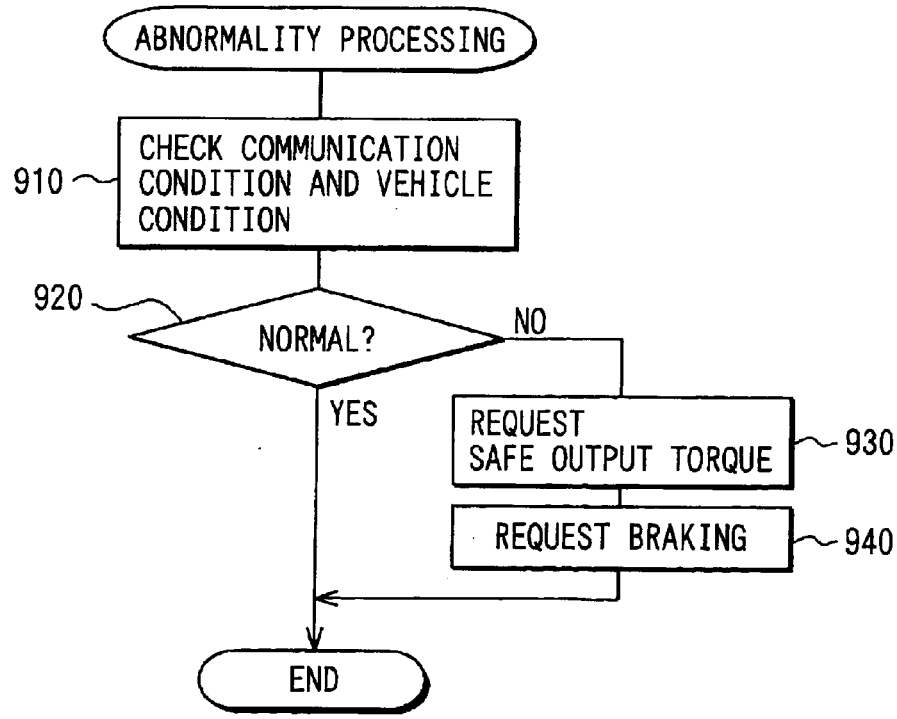
FIG. 6 is a flow chart of an abnormality processing routine of the vehicle coordinator.

FIG. 6 illustrates the abnormality processing routine. First, at step 910, the reception condition from other ECUs and the transmission condition to these ECUs on the serial communication line 10 are checked. Moreover, it is checked whether information indicating an emergency condition requiring stop of the vehicle is received from another program. The information indicative of an emergency condition is information or the like of a failure, for example, in a transmission ECU 300.

Next, from the checking result at step 920, it is determined whether the current vehicle condition is normal. The normal condition of the vehicle is the case where transmission to and reception from other ECUs is normal and no information indicating an emergency condition is received from any other programs.

If it is determined to be normal, the abnormality processing routine ends as it stands. If it is determined to be abnormal, the vehicle coordinator 101 executes a process for stopping traveling of the vehicle. That is, at step 930, the vehicle coordinator 101 transmits a command of a target axle torque having a safe value for stopping the vehicle to the power train coordinator 201. In response to this, the power train coordinator 201 supplies to the engine control program 202 a command indicating that a control for stop of ignition and fuel injection of the engine is conducted.

Further, at step 940, the vehicle coordinator 101 supplies a command for stopping the vehicle to the vehicle behavior coordinator 102. This causes the vehicle behavior coordinator 102 to supply a command of stopping the vehicle to the vehicle stability coordinator 103. The vehicle stability coordinator 103 supplies to the brake control program 104 a command for control of the brake operation.

According to this operation, the engine stops in response to the command from the vehicle coordinator 101 if the vehicle is in an abnormal condition, causing an emergency stop of the vehicle by the operation of the brake. Here, in this case, a larger portion contributing to the emergency stop is the operation of the brake. That is, only stop of ignition in the engine provides gradually deceleration by the engine braking although the vehicle will stop finally. Thus, to avoid a danger on emergency by emergency stop is obtained by controlling the brake finally providing an enforcement power by the vehicle coordinator 101. In other words, the brake control program 104 is a control means for controlling the functional element capable of making an emergency stop of the traveling vehicle.

As described above, the ABS ECU 100 has the vehicle coordinator 101, the brake control program 104, and all programs on the passage from the vehicle coordinator 101 to the brake control program 104, so that the vehicle coordinator 101 can transmit and receive information only with the inter-process communication without using the brake control program 104 and the serial communication line 10.

Accordingly, in the system in which the integrated control of the vehicle functions is carried out by the vehicle coordinator 101 or the like through the intra-vehicle communication network, avoiding a danger on emergency can be provided though the intra-vehicle communication network has a failure such as disconnection of the serial communication line 10.

Here, because it is possible to read in other words such that a plurality of programs are combined into one program, if it is assumed that the vehicle coordinator 101 corresponds to the manager, the vehicle behavior coordinator 102, the vehicle stability coordinator 103, the brake control program 104, and a front brake control program 105 can be considered to be one program as a control means.

Further, if it is assumed that the vehicle coordinator 101, the vehicle behavior coordinator 102, and the vehicle stability coordinator 103 are considered to be one program as the manager, the brake control program 104 can be regarded as the control means.

Moreover, similarly, if it is assumed that combination of the vehicle coordinator 101 and the vehicle behavior coordinator 102 is considered as the manager, the vehicle stability coordinator 103 and the brake control program 104 can be considered to be one program as the control means.

(Second Embodiment)

Figure 7:
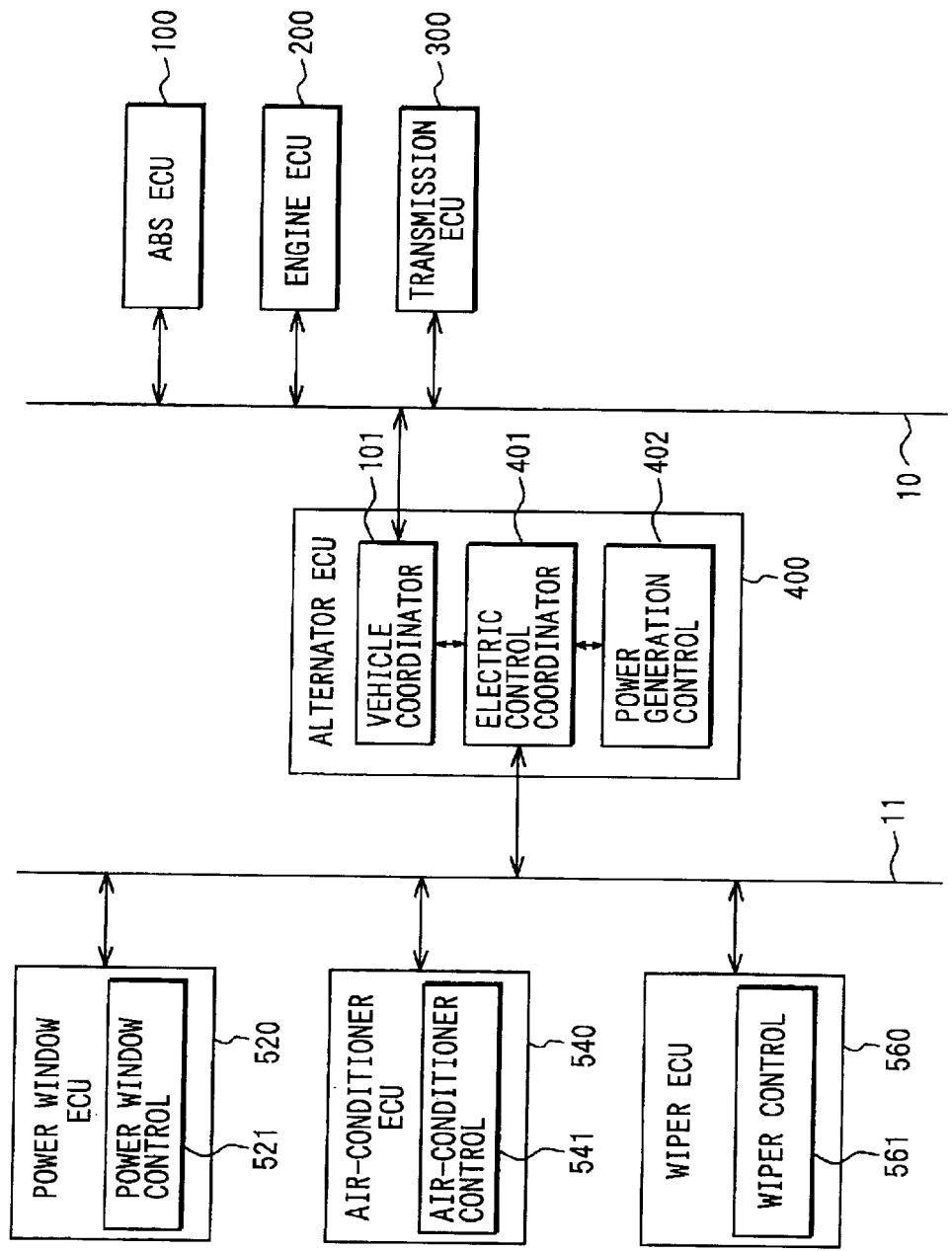
FIG. 7 is a structural diagram of an intra-vehicle communication network according to the second embodiment of the present invention.

FIG. 7 illustrates an intra-vehicle communication network for realizing an integrated vehicle control system according to the second embodiment of the present invention. This communication network has two serial lines 10 and 11 in which an ABS ECU 100, an engine ECU 200, and a transmission ECU 300 are connected to the serial communication line 10 as nodes, respectively, and a power window ECU 520, an air-conditioner ECU 540, and a wiper ECU 560 are connected to the serial communication line 11 as nodes, respectively. Moreover, an alternator ECU 400 is connected to both of the serial communication lines 10 and 11.

Here, each ECU has the basic structure shown in FIG. 3. However, in this embodiment, only programs executed by the microcomputer in each ECU are described. In this embodiment the parts having the same functions as those in FIG. 4 are designated with the same names and references. However, the flash memory of the microcomputer in the ABS ECU 100 does not include the vehicle coordinator 101, but the microcomputer in the alternator ECU 400 includes the vehicle coordinator 101. Moreover, because description about programs in this embodiment executed by the microcomputers in the ABS ECU 100, the engine ECU 200, and the transmission ECU 300 are the same as those in the first embodiment except that the ABS ECU 100 does not have the vehicle coordinator 101, the description will be omitted.

The power window ECU 520, the air-conditioner ECU 540, and the wiper ECU 560 are ECUs for controlling operations of the power window, the air-conditioner, the wiper as functional elements, respectively, and thus have a power window control program 521, an air-conditioner control program 541, and a wiper control program 561, respectively.

The power window control program 521, the air-conditioner control program 541, and the wiper control program 561 receive commands as to operations from the electric control coordinator 401 and transmit information of operation conditions such as a used electric power to the electric control coordinator 401.

Figure 8:
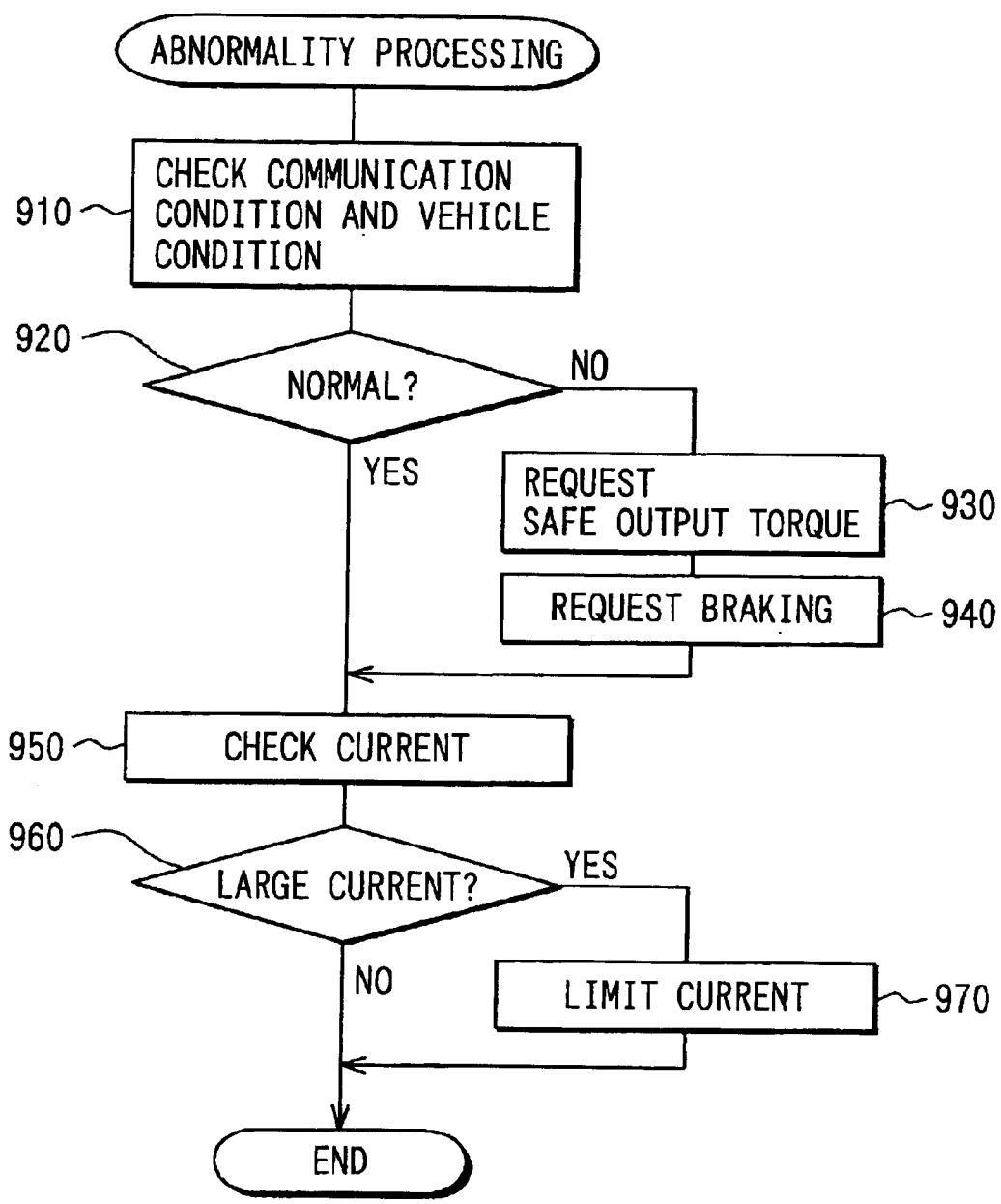
FIG. 8 is a flow chart of an abnormality processing routine of the vehicle coordinator in the second embodiment.

The vehicle coordinator 101 executes the same process as that shown in FIG. 5. However, the content of the abnormality processing routine is different. The abnormality processing routine of the vehicle coordinator 101 according to the present embodiment is shown in FIG. 8. In this embodiment, the same processing as those in the abnormality processing routine in FIG. 6 is designated with the same references. Hereinbelow this abnormality processing routine will be described.

After it is determined to be normal at step 920, or after process of the step 940, the vehicle coordinator 101 receives information of operation conditions of electric devices such as the power window, the air-conditioner, the wiper, or the like from the electric control coordinator 401, and inputs information of the output current of the alternator controlled by the power generation control program 402 from the electric control coordinator 401.

Next, at step 960, it is determined whether the received value of the output current is greater than a predetermined value. The predetermined value is a value for setting an upper limit so as to prevent burnout of windings of the alternator because a current of more than its rated output is drawn from the alternator and prevent a current of which value is more than the rating from flowing. This value is previously stored in the flash memory of the microcomputer in the alternator ECU 400.

If it is determined that the value of the output current is equal to or less than the predetermined value, the abnormality processing routing ends. If the value is greater than the predetermined value, processing proceeds to step 970. In the step 970, a command for limiting the amount of current of the alternator equal to or less then the predetermined value is supplied to the electric control coordinator 401. Alternatively, at step 970, it is also possible to supply a command to the electric control coordinator 401 so as to select electric devices to be stopped from them on the basis of the received information of operation of the power window ECU 520, the air-conditioner ECU 540, the wiper ECU 560 or the like and stop the selected electric devices. This causes the electric control coordinator 401 to transmit commands to the power generation control program 402, or the power window ECU 520, the air-conditioner ECU 540, and the wiper ECU 560. As a result, the output current from the alternator becomes equal to or less than the rating, so that it is possible to avoid emergency relating to breakage of the alternator and the power supply line.

As described above, the alternator is one of functional elements capable of limiting current supply to functional elements in the vehicle.

Moreover, the alternator ECU 400 includes the electric control coordinator 401 and the power generation control program 402, so that the vehicle coordinator 101 can transmit and receive information only through the inter-process communication without use of the serial communication lines 10 and 11.

Accordingly, in the system in which the integrated control of the functions of the vehicle is executed by the vehicle coordinator 101 or the like through the intra-vehicle communication network, it is possible to avoid danger on emergency though the intra-vehicle communication network has a failure such as disconnection in the serial communication line 10 or 11.

Here, in the same manner as that in the first embodiment, it is possible to consider that a plurality of programs is combined into one program. If it is assumed that the vehicle coordinator 101 corresponds to the manager, the electric control coordinator 401 and the power generation control program 402 can be considered to be one program as a control means.

Further, if it is assumed that the vehicle coordinator 101 and the electric control coordinator 401 are considered to be one program as the manager, the brake control program 104 can be regarded as the control means.

Moreover, assuming that the electric control coordinator 401 is considered as the manager, the power generation program 402 can be considered as the control means.

(Third Embodiment)

Figure 9:
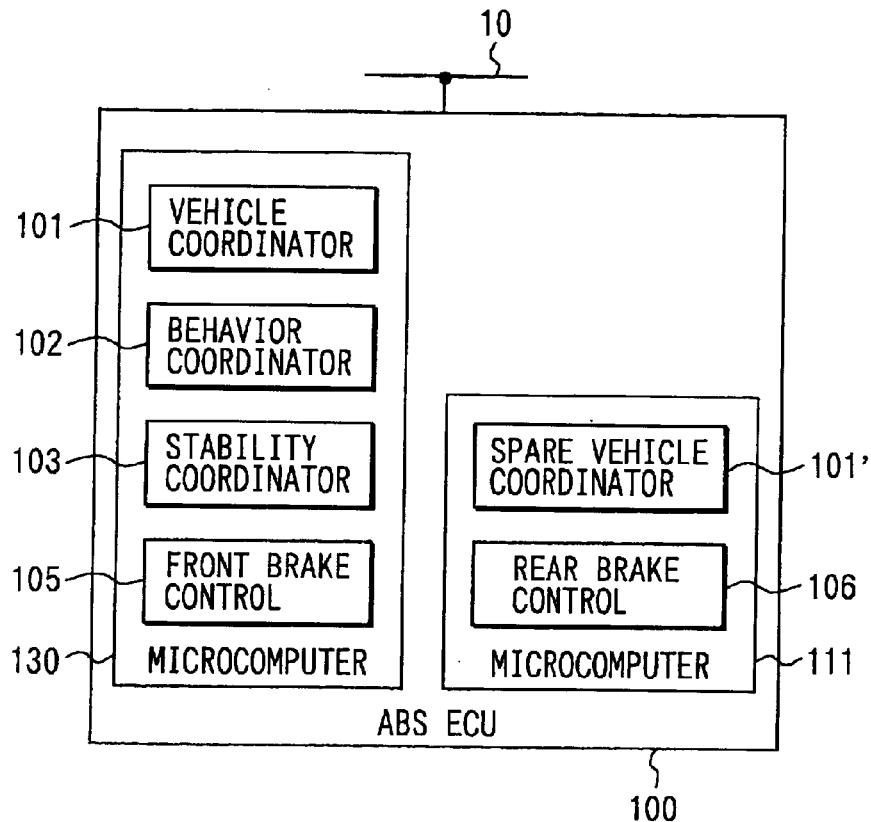
FIG. 9 is a structural diagram of an ABS ECU according to the third embodiment of the present invention.

In the third embodiment, the ABS ECU 100 in the communication network of the integrated control system shown in FIG. 4 in the first embodiment is changed. FIG. 9 illustrates the ABS ECU 100 of the present embodiment. Here, the driver/receiver IC and the protocol IC are also omitted in FIG. 9 in the same manner as those in FIG. 5.

This ABS ECU 100 has two microcomputers, namely microcomputers 130 and 111. These microcomputers are connected to the same protocol IC through independent communication lines, respectively. This protocol IC executes process for distributing communications directed to respective microcomputers in addition to the function described in the first embodiment.

The structure of the microcomputer 130 is provided, in the microcomputer 110 shown in FIG. 4, by replacing the brake control program with the front brake control program 105.

The front brake control program 105 is a program for detecting the wheel speed of the front wheels and controlling the brakes of the front wheels on the basis of the wheel speed and the command of the vehicle stability coordinator 103.

The microcomputer 111 includes a CPU, a flash memory, and a RAM (not shown) and further includes a spare vehicle coordinator 101' and a rear brake control program 106 in the flash memory, and processes are executed by reading these programs from the flash memory and executing the programs on startup.

The rear brake control program 106 is a program for detecting the wheel speed of the rear wheels and controlling the brakes of the rear wheels on the basis of this wheel speed and the command from vehicle stability coordinator 103.

Figure 10:
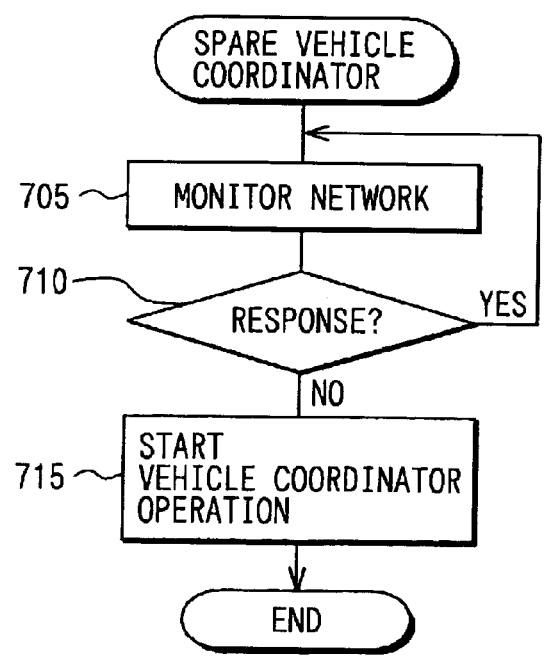
FIG. 10 is a flow chart of process of a spare vehicle coordinator in the third embodiment.

The spare vehicle coordinator 101' functions as a spare vehicle coordinator when the function of the vehicle coordinator 101 is inoperative. FIG. 10 shows a flow chart of the spare vehicle coordinator 101'.

At step 705, the spare vehicle coordinator 101' monitors the network. More specifically, it monitors the data flowing through the serial communication line 10. When there is transmission to the vehicle coordinator 101 in the serial communication line 10, it checks whether the vehicle coordinator 101 correctly transmits a response in accordance with the communication protocol.

Next, at step 710, the spare vehicle coordinator 101' determines whether there is a correct response from the vehicle coordinator 101. If there is a correct response, processing returns to step 705, and the spare vehicle coordinator 101' continues monitoring. If there is no correct response, processing proceeds to step 715 where the spare vehicle coordinator 101' starts the processing which is equivalent to that executed by the vehicle coordinator 101. More specifically, it starts processing in FIGS. 5 and 6 at step 810.

Here, the vehicle coordinator 101 is included in the microcomputer 130 having the front brake control program 105, and the spare vehicle coordinator 101' is included in the microcomputer 111 having the rear brake control program 106. This is because the brake for front wheels has a higher efficiency than the brake for rear wheels as the braking of the vehicle on emergency.

As described above, out of a plurality of managers (the vehicle coordinator 101 and the spare vehicle coordinator 101'), one of the managers to be operated is successively used with priority in order of the node including the manager having the program for controlling the functional element having a higher function in avoiding a danger of the vehicle on emergency.

In addition to the advantage of the first embodiment, this structure can increase robustness of the vehicle integrated control system because the spare vehicle coordinator 101' operates instead of the vehicle coordinator 101 though the vehicle coordinator 101 is inoperative.

(Fourth Embodiment)

Figure 11:
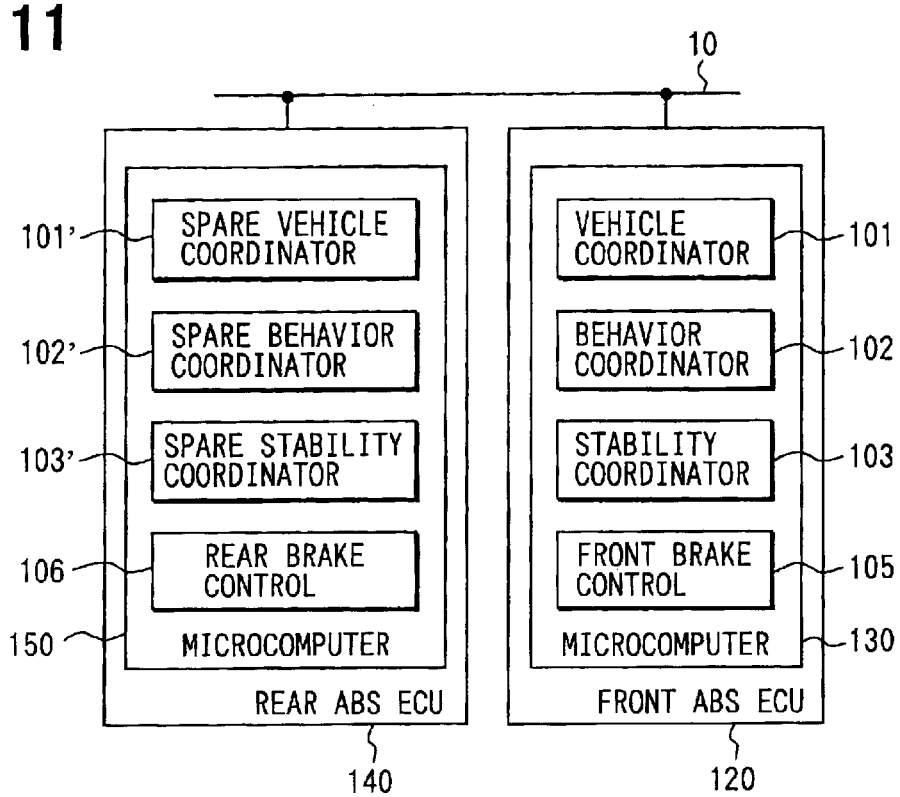
FIG. 11 is a structural diagram of a front ABS ECU and a rear ABS ECU according to a fourth embodiment of the present invention.
Figure 12:
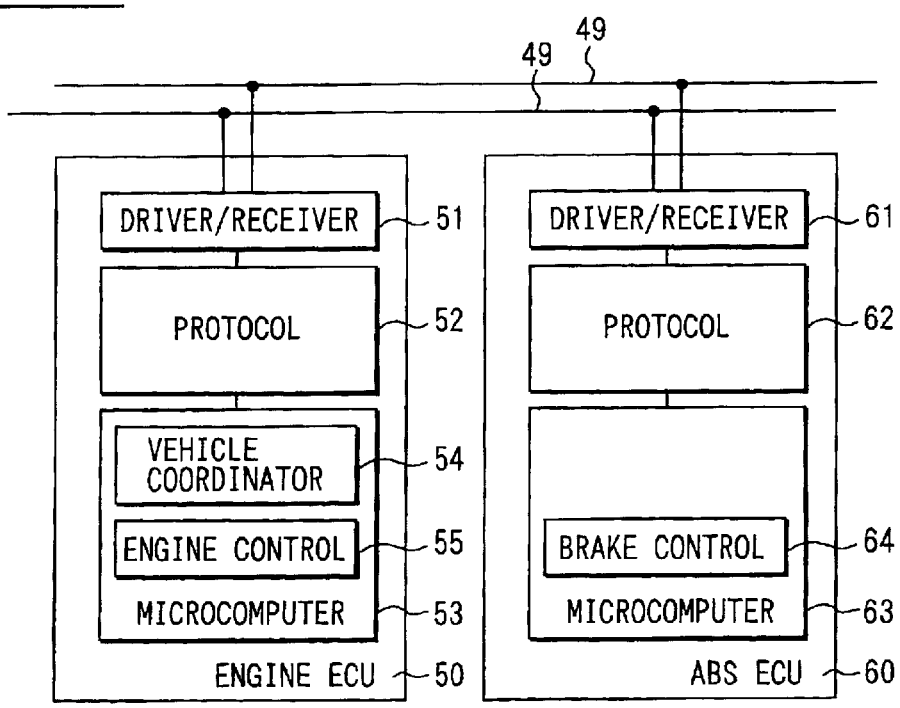
FIG. 12 is a structural diagram of an engine ECU and an ABS ECU in a vehicle integrated control system according to a related art.

In this embodiment, the ABS ECU is divided into two ECUs 120 and 140 in the communication network of the integrated control system as shown in FIG. 11. Here, the driver/receiver IC and the protocol IC are also omitted in FIG. 11 in the same manner as those in FIG. 5. Moreover, the same structural parts in FIG. 9 are designated with the same references. The front ABS ECU 120 and the rear ABS ECU 140 are those having the common structure in FIG. 3.

The front ABS ECU 120 has the same microcomputer 130 shown in FIG. 9. The rear ABS ECU 140 has a microcomputer 150 including the spare vehicle coordinator 101', a spare vehicle behavior coordinator 102', a spare vehicle stability coordinator 103', and a rear brake control program 106 in the flash memory.

The vehicle behavior coordinator 102' and the spare vehicle stability coordinator 103' perform the same operations as the spare vehicle coordinator 101'. That is, the spare vehicle behavior coordinator 102' monitors the communication network within the vehicle and starts an equivalent operation instead of the vehicle behavior coordinator 102 when it detects that the vehicle behavior coordinator 102 does not respond correctly. Moreover, the spare vehicle stability coordinator 103' monitors the communication network within the vehicle and starts an equivalent operation instead of the vehicle stability coordinator 103 when it detects that the vehicle stability coordinator 103 does not respond correctly.

In the normal condition where the spare vehicle coordinator 101' monitors the network, it monitors this vehicle coordinator 101'. When the spare vehicle coordinator 101' starts processing instead of the vehicle coordinator 101, respective portions start processing instead of the vehicle behavior coordinator 102 and the vehicle stability coordinator 103.

As described above, out of a plurality of managers (a group of the vehicle coordinator 101, the vehicle behavior coordinator 102, and the vehicle stability coordinator 103 and a group of the spare vehicle coordinator 101', the spare vehicle behavior coordinator 102', and the spare vehicle stability coordinator 103') one of the managers is successively used with priority in order of the node including the manager having the control means for controlling the functional element having a higher function in avoiding a danger of the vehicle on emergency.

In addition to the advantage of the first embodiment, this structure can increase robustness of the vehicle integrated control system because the spare vehicle coordinator 101', the spare vehicle behavior coordinator 102', and the spare vehicle stability coordinator 103' operate instead of the vehicle coordinator 101 though the vehicle coordinator 101, the vehicle behavior coordinator 102, and the vehicle stability coordinator 103 are inoperative.

(Other Embodiments)

In the first embodiment, the control means for controlling the functional element stopping the vehicle on emergency is the program including the brake control program 104 and the program including the brake control program 104. However, for example, in the case of an electric vehicle, it is also possible that this is a control program for controlling electric motors for driving the vehicle.

Moreover, in the third and fourth embodiments, only one of two managers having the same function temporality operates and one manager out of them having the higher priority is successively used. However, it is not always necessary that they have priorities, but it is also possible that managers are made to have two systems, and when one side is inoperative, the other operates instead.

The present invention should not be limited to the disclosed embodiments, but may be implemented in many other ways without departing from the spirit of the invention.

What is claimed is:

1. A vehicle integrated control system comprising:
    a plurality of nodes coupled to an intra-vehicle communication network and including control means for controlling at least one of operations of a plurality of functional elements of a vehicle; and
    a manager for supplying operation commands to more than one of the control means, the control means controlling the operation of the functional element thereof on the basis of inputted operation command,
    wherein the manager is included in at least one of nodes having the control means that controls the functional element capable of avoiding a danger of the vehicle on emergency out of a plurality of the control means of a target supplied with the operation commands, and
    wherein the manager supplies the operation commands through the intra-vehicle communication network to, out of a plurality of the control means of the target supplied with the operation commands, the control means in the nodes other than the node including the same, and supplies the operation command through the intra-node communication to, out of a plurality of the control means of the target supplied with the operation commands, the control means included by the node including the same for controlling the functional element capable of avoiding a danger of the vehicle on emergency.

2. The vehicle integrated control system as claimed in claim 1,
    wherein the manager is included in at least one node including, out of a plurality of the control means of a target supplied with the operation commands, the control means for controlling the functional element capable of an emergency stop of traveling of the vehicle.

3. The vehicle integrated control system as claimed in claim 2,
    wherein the manager is included in the node having the control means for controlling a brake out of a plurality of the nodes.

4. The vehicle integrated control system as claimed in claim 1, wherein the manager is included in at least one of nodes including, out of a plurality of the control means of a target supplied with the operation commands, control means for controlling the functional element capable of limiting a current supply to a functional element of the vehicle.

5. The vehicle integrated control system as claimed in claim 4,
wherein the manager is included in one node out of a plurality of the nodes including control means for controlling an alternator.

6. The vehicle integrated control system as claimed in claim 1,
wherein the manager is included in at least two of nodes having control means for controlling the functional elements capable of avoiding a danger of the vehicle out of a plurality of the nodes, only one of the managers included in at least two nodes operates temporarily, and as the operating manger, one of the managers is successively used with priority in order of the node including the manager having the control means for controlling the functional element having a higher function in avoiding a danger of the vehicle on emergency.

7. The vehicle integrated control system as claimed in claim 1,
wherein the manager is included in at least two of nodes having control means for controlling functional elements capable of avoiding a danger of the vehicle out of a plurality of the nodes, only one of the managers included in at least two nodes operates temporarily, and when one of managers under operating becomes inoperative, another manager other than the one of manager under operating operates alternatively.

* * * * *